Oct. 28, 1969     J. M. RESETICH     3,474,605
CROP PICKUP DEVICE FOR A HARVESTER
Filed April 4, 1967     2 Sheets-Sheet 2

INVENTOR.
J. M. RESETICH

United States Patent Office 3,474,605
Patented Oct. 28, 1969

3,474,605
CROP PICKUP DEVICE FOR A HARVESTER
John Martin Resetich, Silvis, Ill., assignor to Deere & Company, Moline, Ill., a corporation of Delaware
Filed Apr. 4, 1967, Ser. No. 628,360
Int. Cl. A01d 57/06, 43/02, 87/00
U.S. Cl. 56—27          8 Claims

ABSTRACT OF THE DISCLOSURE

An endless belt-type crop pickup device for attachment to an auger-type grain harvesting platform on a combine, the upper crop delivery portion of the belt having an upwardly and rearwardly inclined forward portion for elevating the crop from the ground and a horizontal rearward portion for directing the crop to the auger in a horizontal path.

Background of the invention

This invention relates to an improved belt-type pickup device for attachment to an auger-type grain harvesting platform on a combine.

A typical grain combine carries a forwardly disposed, transversely elongated platform or header, having a mower bar along its leading edge and a tranverse conveyor behind the mower bar for conveying the crop toward the center of the platform and delivering it rearwardly to a crop feeding housing, through which the crop is moved to the separator portion of the combine. In some areas, with certain grain crops, it has been necessary to separately cut and windrow the crop prior to the subsequent combining operation.

In such a case, it is necessary to provide means on the combine platform for lifting the windrowed crop from the field and delivering it to the platform conveyor, which of course delivers it to the combine separator in the conventional manner. Typically, such pickup means have been removably attachable to the platform and have comprised a belt-type conveyor having a large number of outwardly extending pickup fingers, the conveyor belt being trained around a pair of transverse rollers with the upper run of the belt inclining upwardly and rearwardly to lift the crop from the ground and move it rearwardly to the platform conveyor. While the angle of inclination of the upper run of the belt has varied somewhat, it has been found that at least a 25° inclination is desirable to avoid picking up rocks and foreign material. In addition, a greater slope permits a greater elevation of the platform for a given length of the pickup belt, and the 25° slope has afforded sufficient platform elevation for the clearance of ground obstructions.

However, problems have arisen with bunching of the crop between the auger and the discharge end of the pickup conveyor, especially in long straw conditions. This has occurred since the pickup imparts a velocity to the crop, impelling it in an upward and rearward trajectory, which, when the pickup conveyor has the desired inclination, causes the material to engage the auger above its center line. Upon striking the upper, forwardly moving portion of the auger, the crop material travels in a loop before moving under the auger, the looping movement of the material between the pickup conveyor and auger causing a bunching of the crop at this location and a consequent uneven or slug feeding of the combine separator, resulting in uneven threshing of the crop. Increasing the distance between the pickup and the auger could alleviate this particular problem, but it has been found that this solution created a feeding problem in short and damp material.

Summary of the invention

According to the present invention, an improved pickup conveyor is provided for attachment to and cooperation with such auger-type combine platforms, the improved pickup conveyor having an upper run divided into a forward portion with a substantial inclination to permit sufficient elevation of the platform and prevent the picking up of rocks and other foreign material, and a rearward portion that is substantially horizontal so that the crop is fed horizontally to the lower, rearwardly moving portion of the auger.

Another feature of the invention resides in the use of just three rollers to provide such a dual angle pickup belt, so that the improved belt is substantially the same in cost, complexity, and durability as a conventional two-roller-belt-type pickup.

Still another object of the invention is to provide such a pickup with a relatively large roller at the junction of the forward and rear portions of the upper belt, so that the tip speed of the pickup fingers is not substantially increased when the upper run of the belt changes direction.

Description of the preferred embodiment

Figure 1:
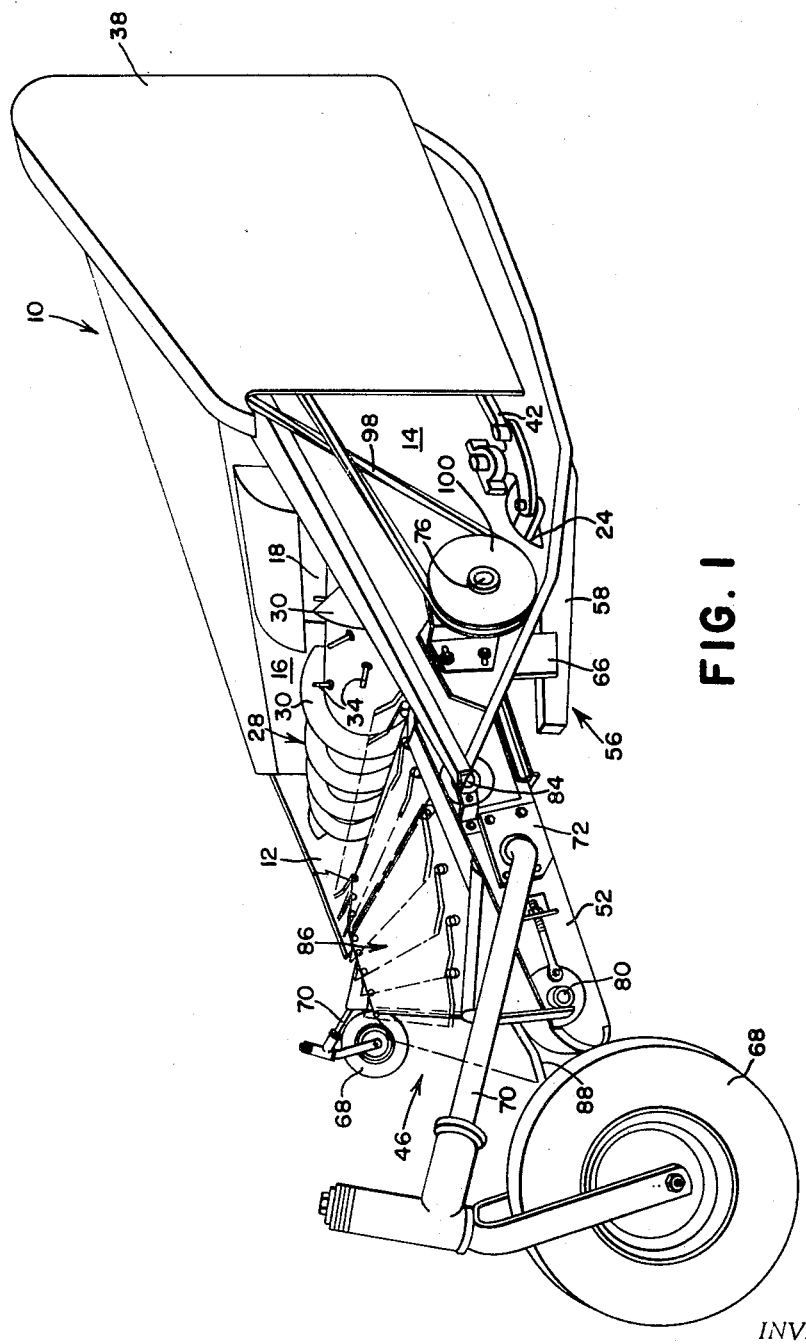
FIG. 1 is a left front perspective of a typical combine grain harvesting platform with an embodiment of the improved windrow pickup mounted thereon.

The preferred embodiment of the invention is illustrated in conjunction with a typical grain harvester platform, indicated in its entirety by the numeral 10. Those skilled in the art will recognize that such a platform is conventionally mounted on the forward part of a combine for removing the crop from the field and feeding it to the combine separating mechanism. The platform 10 is transversely elonagted and includes generally triangular right and left side panels 12 and 14 respectively at its opposite ends, and a generally upright rear panel 16, extending between the side panels 12 and 14 and having a central crop discharge opening 18, which registers with the forward crop inlet opening on a conventional combine feeder house. The platform 10 also includes a generally horizontal bottom 20 extending between the side panels and having a transverse beam member 22 along its leading edge, which supports a transverse mower bar 24 extending the width of the platform.

The lower portion of the rear panel and the rearward portion of the bottom 20 gradually converge, forming a transverse trough 26 associated with a transverse auger-type conveyor 28, which also extends between the opposite side panels 12 and 14. The auger 28 has oppositely wound auger flights 30 at its opposite ends and a cylindrical central section between the auger flights 30 and opposite the rear opening 18, the central section having a plurality of radially extending fingers 34, which impel the crop rearwardly through the opening 18. The auger 28 is rotated in the direction of the arrow 36 in FIG. 2 by a drive at its left-hand end, most of the drive being hidden by a drive shield 38. The drive is connected to and driven by a transverse platform drive shaft 40, journaled on the rearward side of the left-hand portion of the platform 10 and driven by a power source on the combine in the conventional manner. The shaft 40 is also drivingly connected to the mower bar 24 by a pitman type mower drive 42, a portion of which is shown in FIG. 1. The platform is reinforced by a plurality of transversely spaced C-shaped members 44 attached and conforming to the bottom 20 and rear panel 16 and connected at their forward end to the beam 22.

Mounted on and extending forwardly from the platform 10 is a windrow pickup, indicated in its entirely by the numeral 46. The pickup includes a frame 48, having right and left side members 50 and 52, connected by a transverse tubular frame member 54. The pickup is detachably mounted on the platform by a mounting means indicated in its entirety by the numeral 56 and including a pair of fore-and-aft beams 58 underlying the platform bottom 20. The beams 58 have their rearward ends removably attached to the rear wall 16 by means of vertical channel-shaped members 60 and their forward ends removably attached to the transverse forward beam 22 by means of brackets 62, extending upwardly from the beams 58 and attachable to brackets 64, which in turn are removably attached to the forward beam 22. The pickup frame 48 is swingably mounted on a pair of upright members 66, rigidly projecting upwardly from the forward end of the beams 58, the members 66 being respectively connected to the rearward portion of the right and left sides 50 and 52 of the frame, so that the forward end of the pickup is vertically adjustable. The forward end of the pickup is supported above the ground by a pair of gauge wheels 68 at the opposite sides of the pickup, the wheels being respectively connected to the opposite sides 50 and 52 of the frame via tubular wheel support members 70 rigidly secured to the sides of the frame via side plates 72.

A rearward transverse roller 74 is journalled at opposite ends in and extends between the frame sides 50 and 52, the roller including an axial shaft 76, which extends through the frame sides and has its opposite ends journaled in the upright members 66 so that the shaft 76 also functions as a pivot connection between the pickup frame 48 and the upright members 66. A forward roller 78 similarly includes an axial shaft 80 journaled at opposite ends in the right and left sides of the frame 50 and 52, the forward roller 78 being parallel to, and coextensive with the rear roller 74. An intermediate roller 82 also includes an axial shaft 84, having its opposite ends journaled in the sides 50 and 52, the intermediate roller 82 being coextensively parallel to and between the forward and rear rollers, substantially above the forward roller but on substantially the same horizontal plane as the rear roller.

A relatively wide or transversely elongated, endless, flexible belt 86 is trained around the three rollers and carries a large number of outwardly extending pickup fingers 88, only a small portion of the pickup fingers being illustrated in the drawings for purpose of clarity, the fingers being of conventional spring-like construction. The belt includes an upper crop conveying run or path 90 and a lower return run or path 92, the forward and rear rollers delineating the upper and lower runs. The upper run 90 includes a forward and rear portion 94 and 96 respectively, the intermediate roller 82 contacting the upper run only. The forward portion 94 of the upper run extends between the forward roller 78 and the intermediate roller 82 and is inclined upwardly and rearwardly from the ground, the illustrated embodiment of the pickup having approximatedly a 25° inclination, while the rear portion 96 extends between the intermediate and rearward rollers and is substantially horizontal.

The belt 86 is driven by the rear roller 74 so that the upper run of the belt moves rearwardly while the lower run of the belt moves forwardly. The rear roller, in turn, is driven by a belt drive 98, which includes a sheave 100 affixed to the end of the roller shaft 76, the belt drive 98, being partially hidden by the shielding 38 and being connected to and driven by the header input shaft 40 in the conventional manner. The tips of the pickup fingers 88 trace a path, indicated by the numeral 102 in FIG. 2, as the belt rotates, the finger tips moving proximate to the ground at the forward end of their path to lift the crop from the ground, and then moving the crop rearwardly along the upper run 90 of the belt and impelling it rearwardly at the rearward end of its path.

Figure 2:
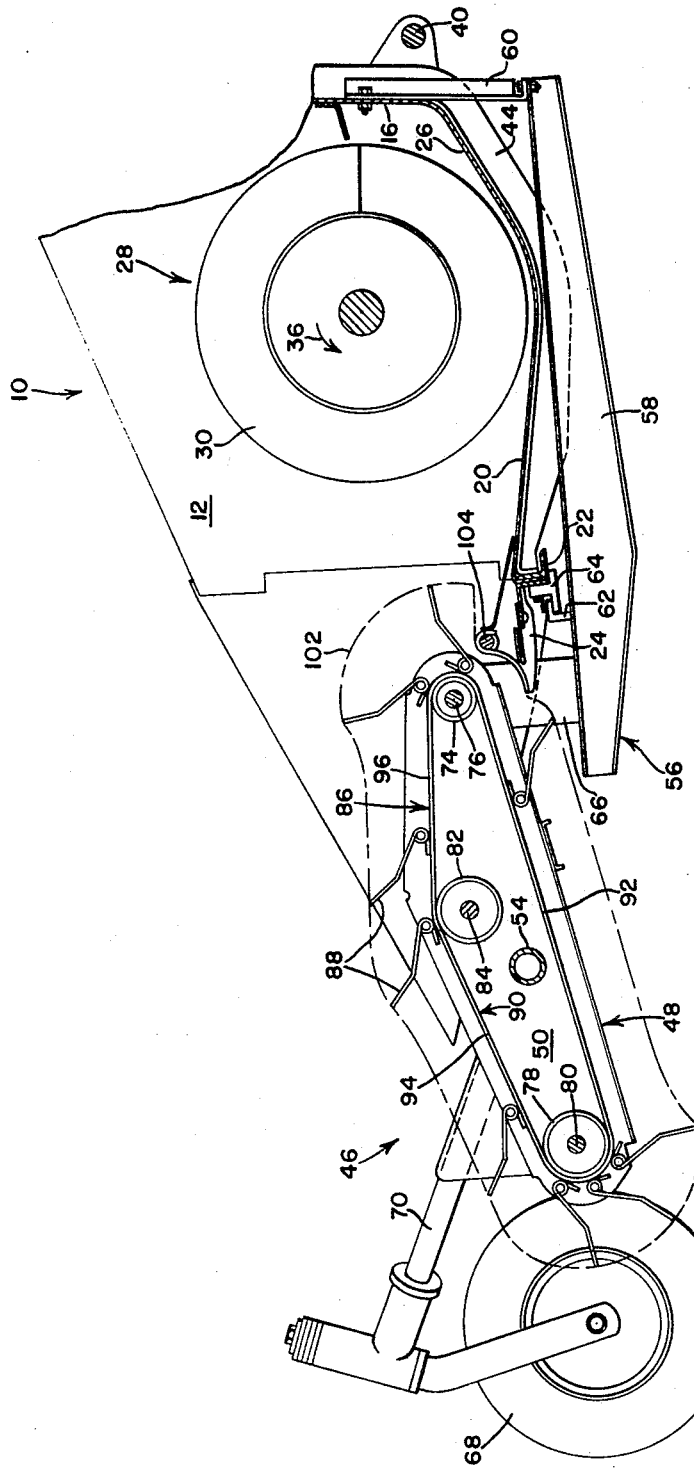
FIG. 2 is a fore-and-aft vertical section of the pickup and a portion of the platform on which is is mounted.

As shown in FIG. 2, a transverse stripper bar 104 is mounted on the platform above the mower bar 24 adjacent to the rear roller 74 and projects into the path of the fingers 88 so that the fingers slide across the stripper bar, thereby stripping any crop material from the fingers.

In operation, when the combine is to be utilized for the harvest of previously cut and windrowed crops, the pickup unit 46 is mounted on the platform 10, the attachment being simply and quickly accomplished via the mounting means 56. The platform 10 is elevated a sufficient height to clear any obstructions, and the gauge wheels 68, which are conventionally adjustable, are set to provide the desired amount of clearance between the forward end of the pickup 46 and the ground. The entire pickup unit is vertically swingable about the shaft 76 so the pickup will follow the contour of the ground. As the machine advances along the windrow, the pickup fingers 88 at the forward end of the pickup elevate the crop as the belt goes around the forward roller 78. The crop is then conveyed upwardly and rearwardly along the forward portion 94 of the upper run 90, the forward portion 94 of the upper run having at least a 15° slope, but preferably a 25° slope, so that rocks and other foreign material will not be picked up with the cop, and sufficient elevation of the platform is provided without an undue length of the pickup.

After the crop is elevated by the forward portion 94 of the upper run, it moves rearwardly along the generally horizontal rear portion 96, the crop being thrown rearwardly as the belt goes around the rear rollers 74, any crop remaining on the pickup fingers being stripped by the bar 104. Since the rear portion 96 of the upper run is generally horizontal and lies in a plane below the axis of the auger 28, the crop is discharged rearwardly in a generally horizontal direction, striking the auger below its center line on the down-turning side of the auger. The auger then converges the crop toward the center of the platform and discharges it rearwardly through the opening 18 to the combine separating mechanism. Since the crop engages the auger below the auger center line, wherein the auger flight 30 is moving downwardly and rearwardly, there is no reaction between the crop and the auger to cause a crop buildup at the forward side of the auger, the crop immediately moving underneath the auger and being conveyed to the center of the platform.

The forward and intermediate rollers 78 and 82 have a relatively large diameter, approximately four inches in the illustrated embodiment, while the rear roller 74 has a smaller diameter, the diameter being less than three inches in the illustrated embodiment, whereby the tips of the pickup fingers 88 move at a greater speed around the rear roller than around the front roller. The relatively large diameter of the intermediate roller causes the tips of the pickup fingers to move at a more constant speed around the intermediate roller so that the crop is not thrown upwardly at the intermediate roller.

Other features and advantages of the present invention will readily occur to those skilled in the art, as will many modifications and alterations in the preferred embodiment of the invention described herein, all of which may be achieved without departing from the spirit and scope of the invention.

What is claimed is:

1. In a harvester having a transverse forwardly disposed harvesting platform including a generally horizontal bottom with a transverse leading edge, an axially transverse auger means supported above the platform bottom rearwardly of the leading edge and operative to transversely converge the crop and deliver it rearwardly, and drive means operative to drive the drivable platform components, the improvement residing in an improved crop pickup means for removing the crop from the ground and delivering it rearwardly to the auger means and comprising: a pickup frame; means for removably attaching the frame to the platform and supporting the frame a predetermined distance above the ground forwardly of the auger means; front and rear axially transverse rollers journaled on the frame; an endless conveyor belt trained around the rollers and having a plurality of outwardly extending pickup fingers, said belt having a lower return run, and an upper crop delivery run; means mounted on the pickup frame in association with the upper run between the front and rear rollers and operative to divide the upper run into a forward portion inclined upwardly and rearwardly to form at least a 15° angle with the ground and a rearward generally horizontal portion.

2. The invention defined in claim 1 and including a pickup drive means operatively connected to and driven by the platform drive means and drivingly connected to the conveyor belt for driving the upper run of the belt rearwardly and the lower run of the belt forwardly.

3. The invention defined in claim 2 wherein the rearward discharge end of the horizontal portion of the upper run approximately overlies the leading edge of the platform bottom, forwardly of the forward down-turning side of the auger means and generally below the center line of the auger.

4. The invention defined in claim 3 wherein the means dividing the upper run into forward and rearward portions includes an intermediate roller supported by the frame upwardly and rearwardly of the front roller and forwardly of the rear roller and engaging the upper run of the belt at the junction of the forward and rearward portions of the upper run.

5. The invention defined in claim 4 wherein the forward portion of the upper run is inclined upwardly and rearwardly forming at least a 20° angle with the ground.

6. The invention defined in claim 5 wherein the intermediate roller has a substantially larger diameter than the rear roller whereby the outer tips of the pickup fingers move at a greater speed around the rear roller than around the intermediate roller.

7. The invention defined in claim 4 wherein the forward portion of the upper run is inclined upwardly and rearwardly forming at least a 25° angle with the ground.

8. In a harvester having a transverse forwardly disposed harvesting platform including a generally horizontal bottom with a transverse leading edge, an axially transverse auger means supported above the platform bottom rearwardly of the leading edge and operative to transversely converge the crop and deliver it rearwardly, and drive means operative to drive the drivable platform components, the improvement comprising: a pickup frame; means for attaching the pickup frame to the platform and supporting the frame a predetermined distance above the ground forwardly of the auger means; a first axially transverse roller journaled on the frame forwardly of the auger means and generally above the leading edge of the platform bottom; a second axially transverse roller journaled on the frame forwardly of the first roller; a third axially transverse roller journaled on the frame generally between the first and second rollers and rotatable about an axis above the plane formed by the parallel axes of the first and second rollers; and an endless conveyor belt trained around the rollers and having a plurality of outwardly extending pickup fingers, said belt having a lower return run between the first and second rollers and an upper crop delivery run divided into a forward portion between the second and third rollers and a rearward portion between the third and first rollers.

References Cited
UNITED STATES PATENTS

| | | | |
|---|---|---|---|
| 1,768,171 | 6/1930 | Toms | 56—364 |
| 2,816,413 | 12/1957 | Worrell | 56—364 |
| 2,881,580 | 4/1959 | Ashton | 56—364 |

LOUIS G. MANCENE, Primary Examiner

PASQUALE A. RAZZANO, Assistant Examiner

U.S. Cl. X.R.

56—344, 364